US006978258B2

(12) United States Patent
Chithambaram (10) Patent No.: US 6,978,258 B2
(45) Date of Patent: Dec. 20, 2005

(54) FUZZY LOGIC REASONING FOR INFERRING USER LOCATION PREFERENCES

(75) Inventor: Nemmara Chithambaram, Novato, CA (US)

(73) Assignee: Autodesk, Inc., San Rafael, CA (US)

( * ) Notice: Subject to any disclaimer, the term of this patent is extended or adjusted under 35 U.S.C. 154(b) by 355 days.

(21) Appl. No.: 10/034,442

(22) Filed: Dec. 26, 2001

(65) Prior Publication Data

US 2003/0126100 A1 Jul. 3, 2003

(51) Int. Cl.⁷ .............................. G06F 15/18; G06G 7/00
(52) U.S. Cl. ................................. 706/8; 706/1; 706/14
(58) Field of Search .................. 706/8, 1, 14; 701/200, 701/214

(56) References Cited

U.S. PATENT DOCUMENTS

| | | | | | |
|---|---|---|---|---|---|
| 5,508,707 | A | * | 4/1996 | LeBlanc et al. ............. | 342/457 |
| 5,602,903 | A | * | 2/1997 | LeBlanc et al. .......... | 455/456.2 |
| 5,787,233 | A | * | 7/1998 | Akimoto ...................... | 706/45 |
| 5,790,800 | A | | 8/1998 | Gauvin et al. | |
| 5,978,672 | A | | 11/1999 | Hartmaier et al. | |
| 6,057,854 | A | | 5/2000 | Davis, Jr. et al. | |
| 6,115,754 | A | | 9/2000 | Landgren | |
| 6,205,400 | B1 | * | 3/2001 | Lin ............................. | 701/214 |
| 6,236,365 | B1 | * | 5/2001 | LeBlanc et al. ............ | 342/457 |
| 6,243,709 | B1 | | 6/2001 | Tung | |
| 6,249,252 | B1 | | 6/2001 | Dupray | |
| 6,252,544 | B1 | * | 6/2001 | Hoffberg .................. | 342/357.1 |
| 6,295,502 | B1 | | 9/2001 | Hancock et al. | |
| 6,526,352 | B1 | * | 2/2003 | Johnson et al. ............. | 701/213 |
| 2001/0035836 | A1 | * | 11/2001 | Miceli et al. ................. | 342/22 |
| 2001/0039525 | A1 | * | 11/2001 | Messmer et al. ............. | 705/36 |
| 2002/0169730 | A1 | * | 11/2002 | Lazaridis ...................... | 706/20 |
| 2003/0063072 | A1 | * | 4/2003 | Brandenberg et al. ...... | 345/173 |
| 2003/0065595 | A1 | * | 4/2003 | Anglum ....................... | 705/35 |

FOREIGN PATENT DOCUMENTS

GB          2 352 134          1/2001

OTHER PUBLICATIONS

M. Kantrowitz et al., "Fuzzy Logic and Fuzzy Expert Systems," http://www-2.cs.cmu.edu/groups/AI/html/faqs/ai/fuzzy/part1/faq-doc-0.html, Apr. 1993, 22pp.

* cited by examiner

*Primary Examiner*—Joseph P. Hirl
(74) *Attorney, Agent, or Firm*—Gates & Cooper LLP (57) ABSTRACT

One or more embodiments of the invention provide a method, apparatus, and article of manufacture for refining an approximate location of a mobile device using fuzzy logic reasoning. An approximate location of a device is determined. A rule base that comprises an ordered collection of rules is then read into memory, or loaded from a database. A set of imprecise inputs are captured for processing in the rules. However, prior to processing the inputs in the rules, the inputs are processed to determine a magnitude of participation of the input in the rules. The rules are then applied to the imprecise inputs based on the magnitude of participation to produce a logical product. A refined location is then computed based on the logical product.

42 Claims, 7 Drawing Sheets

FUZZY LOGIC REASONING FOR INFERRING USER LOCATION PREFERENCES

CROSS-REFERENCE TO RELATED APPLICATIONS

U.S. patent application Ser. No. 10/037,805, entitled "MOBILE DEVICE LOCATOR ADAPTER SYSTEM FOR LOCATION BASED SERVICES", by Nemmara Chithambaram, et. al, filed on the same dare herewith;

U.S. patent application Ser. No. 10/034,440, entitled "LOCATION BASED SERVICES BRIDGE TO EXTERNAL DATA SOURCES", by Nemmara Chithambaram, et al, filed on the same date herewith;

U.S. patent application Ser. No. 09/629,115, entitled "METHOD AND APPARATUS FOR PROVIDING ACCESS TO MAPS ON A PERSONAL DIGITAL ASSISTANT (PDA)", by Nemmara Chithambaram et al, filed on Jul. 31, 2000;

U.S. patent application Ser. No. 09/628,851, entitled "GEOGRAPHICAL DATA MARKUP ON A PERSONAL DIGITAL ASSISTANT (PDA)", by Edward J. Cannot, et al., filed on Jul. 31, 2000;

U.S. patent application Ser. No. 09/628,850 filed on Jul. 31, 2000, entitled "GENERALIZED, DIFFERENTIALLY ENCODED, INDEXED RASTER VECTOR DATA AND SCHEMA FOR MAPS ON A PERSONAL DIGITAL ASSISTANT", now issued as U.S. Pat. No. 6,674,445, by Nemmara Chithambaram et al, U.S. patent application Ser. No. 09/795,719, entitled "INTERPROCESS APPLICATION PROGRAMMING INTERFACE FOR PERSONAL DIGITAL ASSISTANT APPLICATIONS," filed on Feb. 28, 2001, by Timothy John Nelson, et. al, U.S. patent application Ser. No. 09/795,890, entitled "SINGLE GESTURE MAP NAVIGATION GRAPHICAL USER INTERFACE FOR A PERSONAL DIGITAL ASSISTANT," filed on Sep. 5,2001, by Nemmara Chithambaram, et. al, U.S. patent application Ser. No. 09/629,117, entitled "METHOD AND APPARATUS FOR OBTAINING A SET OF MAPS", by Howard Marantz et al, filed on Jul. 31, 2000; and Patent Cooperating Treaty application serial number PCT/US00/26436, entitled "GEOGRAPHIC MAPS ON A PERSONAL DIGITAL ASSISTANT (PDA) AND SERVER," filed on Sep. 26, 2000, by Nemmara Chithambaram, et. al,.

U.S. patent application Ser. No. 09/411,506, entitled "VECTOR-BASED GEOGRAPHIC DATA", by Gregory A. Roy, et. al, filed on Oct. 4, 1999, which is a continuation patent application of U.S. Pat. No. 5,966,135 issued on Oct. 12, 1999 (application Ser. No. 08/757,706 filed on Oct. 30, 1996). by Gregory A. Roy et al, entitled "VECTOR-BASED GEOGRAPHIC DATA".

BACKGROUND OF THE INVENTION

1. Field of the Invention

The present invention relates generally to location based services, and in particular, to a method, apparatus, and article of manufacture for refining the location of a mobile device.

2. Description of the Related Art

Detecting the location of a mobile device (e.g., a cellular phone, a personal digital assistant [PDA], etc.) is fundamental to providing location based services (LBS). Location based services are applications/services that utilize or are based on the location of a device. For example, detecting that a device is located on a particular street (e.g., McInnis Parkway) allows an LBS application to provide a nearby theatre (e.g., Northgate Mall Cinema) when a user requests the closest entertainment option. Additional examples of LBS applications include traffic updates, location sensitive billing, fleet management, and asset and people tracking. However, the device location currently provided by prior art wireless carriers is coarse (e.g., with precision ranging in 100s of meters or even 1000 meters or more). LBS services therefore need to refine this location to make the services valuable. These problems may be better understood by describing prior art location detection.

Location Detection Prior Art

A wide variety of methods/protocols are used by mobile device carriers to determine and provide a device's location to an LBS application. For example, different methods may be used to identify the device. Further, different protocols may be used to communicate with the carrier's mobile positioning server (MPS). Different formats for request/response exchange with the mobile positioning server may also be used. Additionally, there may be different levels of robustness, error handling, and network infrastructure stability.

There is often differing levels of precision/accuracy in the location provided by the MPS. For example, most location technology is cell sector based (i.e., a location is merely identified as being within a particular cell sector). Accordingly, the approximate location provided by the MPS could be 150 meters to several 100 meters, or even 1000 meters or more from the actual location of the device. Thus, most MPS services only provide a geographic region that a mobile device is within that is highly inaccurate.

Such imprecision affects the value of an LBS application to a user. For example, more popular LBS applications such as business/entertainment finders, friend finders, and/or routing could be significantly more valuable to the user, if the approximate current location is more accurate. Accordingly, what is needed is the capability to refine an approximate location to a location that better represents the user's true location or to a prominent landmark in the vicinity of the user that the user can readily identify.

Figure 1:
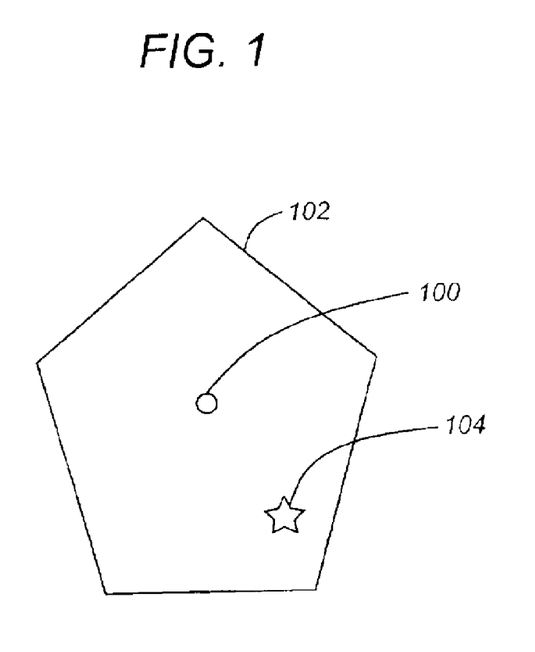
FIG. 1 illustrates an approximate location and an error polygon representing imprecision in the location in the prior art.

FIG. 1 illustrates an approximate location and an error polygon representing imprecision in the location. A device's approximate location is indicated as circle 100. An error polygon 102 represents the imprecision in the location. The problem in the prior art is to produce a refined location 104 that likely represents the user's true position. In addition, refinement is expected to produce a location 104 that is in the vicinity of the user's current location and is prominent enough to be readily identified by the user. Further, in the best case, this refined location 104 equates to the user's true current position.

SUMMARY OF THE INVENTION

One or mote embodiments of the invention provide a method, system, apparatus, and article of manufacture for refining the location of a device using fuzzy logic. Location based services could be of significantly increased value to a user if the application and content were automatically tailored to match a user's current activity profile. For example, a leisure visitor would like to have easy access to the "tourist landmarks" whereas a commuter might be interested in reviewing train and bus stations and alternative routes to quickly get to the destination.

Intelligent reasoning of the user's current location, and activity profile (or intent) helps to filter out unnecessary content, improving the wireless access cost, time, and performance. One or mote embodiments of the invention utilize a branch of artificial intelligence referred to as fuzzy logic reasoning to make intelligent guesstimates about the user's current location, and also inferring the intent of the user's current activity profile (e.g., is the user a business visitor, close to a place of work, or a commuter in the proximity of a train station?).

The model described herein provides formal constructs for capturing vague, imprecise, overlapping, conflicting inputs. For example, the model may deal with the fact that the question "does the current user activity match a leisure visitor profile?" can yield the answer "likely yes" or "uncertain" verses a pure "yes/no" answer. Similarly, the model can account for the fact that the current activity may match both a business visitor profile and a leisure visitor profile.

Inputs may include spatial, temporal (time related), spatio-temporal (velocity vector) and activity profile indicators. The model provides membership functions that translate natural language descriptors (i.e., the inputs) that determine the magnitude of participation of the input (e.g., perhaps=0.4, likely=0.6, very likely=0.8).

Further, the model can represent the current understanding of the problem in the form of an intuitive, human-language, rule base that relates the input to output. For example, a rule may be in the form "if X and Y, then Z" (e.g., if it is cloudy and overcast, then it might rain). The rule base containing all of the rules can be easily configured to reflect regional, social, or demographic trends (e.g., account for the shutdown of establishments during siesta period in Central America).

An inference engine processes the rules by applying them to the inputs based on the membership function evaluations and provides a definite answer as a refined location. This answer can be single refined location or a list of candidates as requested by the application.

As a result, a user's current location may be reasoned, inferred, and classified into one of several "activity profiles". This in turn, enables an application to enhance the value of the vast amount of profile information accumulated by the wireless carriers and improves the value of the service offered to the consumer, by personalizing both the applications and the content delivered to the wireless device.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and in which is shown, by way of illustration, several embodiments of the present invention. It is understood that other embodiments may be utilized and structural changes may be made without departing from the scope of the present invention.

Overview

One or more embodiments of the invention provide a method for using fuzzy logic reasoning to refine the approximate location of a device. Various imprecise inputs are processed by membership functions and assigned three truth values along an interval [0,1]. The truth values define the magnitude of participation of the inputs in rules. An inference engine then processes the inputs in accordance with the truth values through a rule base that comprises one or more rules. Each rule has an antecedent that may utilize the truth values and a consequent that specifies a refined location. The rules produce logical products (within an interval from 0 to 1) for each rule that define the truth value for the consequents. A method is then used to select the appropriate refined location based on the logical products.

Hardware Environment

Figure 2:
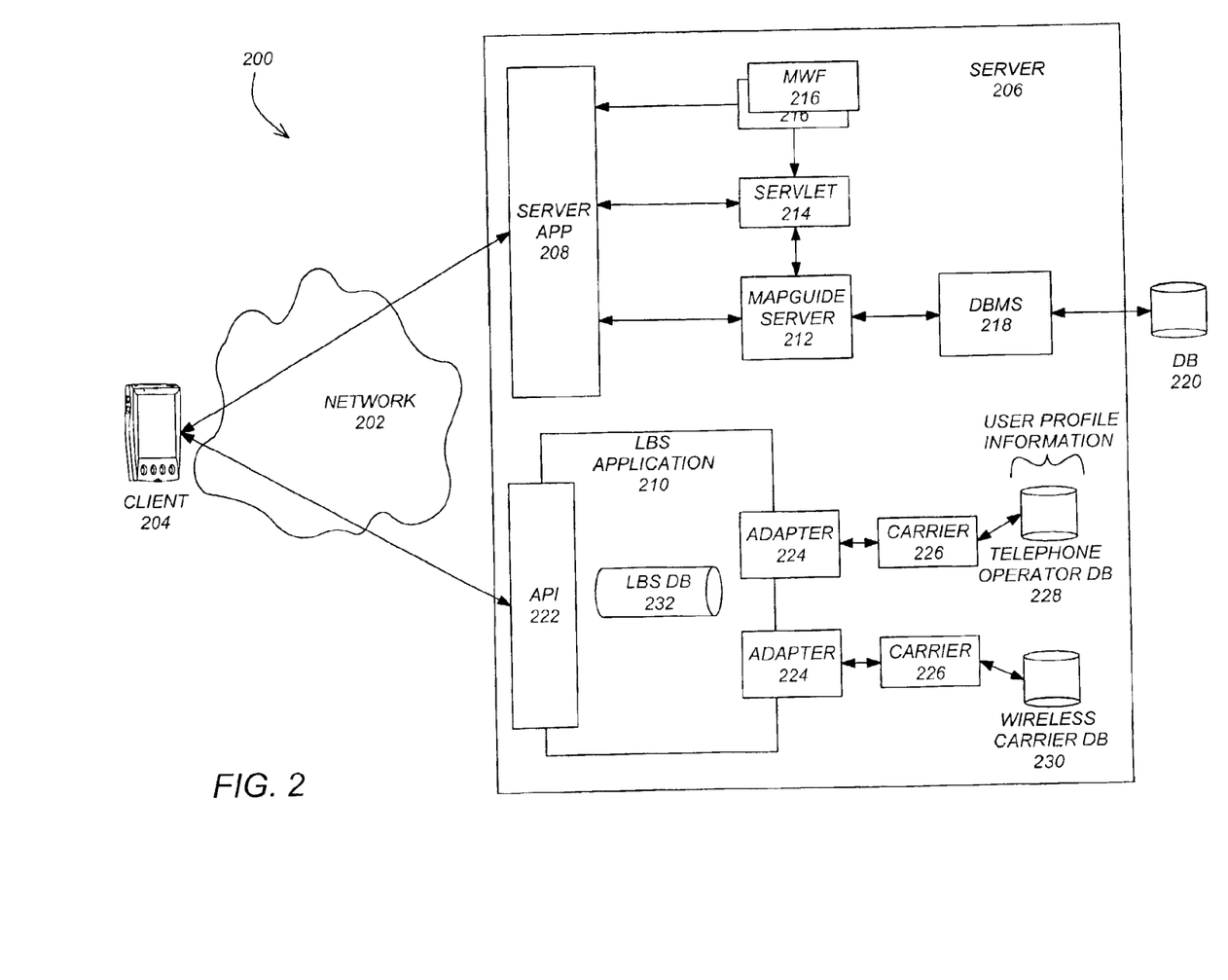
FIG. 2 schematically illustrates a hardware and software environment utilized in accordance with one or more embodiments of the invention.

FIG. 2 schematically illustrates a hardware and software environment utilized in accordance with one or more embodiments of the invention. A typical distributed computer system 200 uses a network 202 (such as the Internet) to connect technicians utilizing mobile device clients 204 (e.g. a cellular phone, PDA, WINCE, or PALM device) or desktop clients (e.g., a computer system running a browser) to server computers 206.

A mobile device client 204 may include any type of mobile device such as handheld personal computers (HPC), palm-held personal computers (PPC or PDA), cellular phones, smart phones, etc. However, embodiments of the invention may be implemented on desktop clients as well. Hereafter, mobile device clients 204 and desktop clients may be used interchangeably and refer to all types of clients/client computer systems. A typical combination of resources used in system 200 may include a network 202 such as a cell phone network, the Internet, IANs, WANs, or the like, mobile devices 204, desktop clients, and servers 206 that are personal computers, workstations, minicomputers, or mainframes.

The network 202 connects mobile device clients 204 or desktop clients executing the appropriate software applications to server computers 206. Server computers 206 may execute a variety of applications including a server application 208 (e.g., a Web server), an LBS application 210, MapGuide server 212, and/or servlet 214. MapGuide servers 212 and servlets 214 may be located within or part of server application 208. The server 206 and its components may also be referred to as a back office system. Such a back office system maintains access to corporate databases, synchronization utilities, etc. The server application 208 is typically a program such as a UNIX Apache Web server or Microsoft's Internet Information Server. The servlet 214 may communicate with a client 204 through server application 208 such that any additional processing required by a client 204 may be performed by the servlet 214.

In a geographic information system (GIS) offering location based services, servlet 214 may communicate with MapGuide server 212 to obtain needed map data/information. Additionally, servlet 214 may access map windows files (MWF) 216 to obtain relevant data. MapGuide server 212 (or another application) may also interact with a database management system DBMS) 218 that may be utilized to retrieve relevant geographical data (such as SDF [Spatial Data Files] data [a special data format for delivering large amounts of data quickly over an intranet or the Internet], raster data, Open DataBase Connectivity (ODBC) data, etc.) from database 220.

Further, client 204 may interface with LBS application 210 through an application programming interface (API) 222 that provides a uniform interface for determining a location of device 204 and providing additional location based services. To determine the location of client device 204, the LBS application may utilize one or more adapters 224 for each of the different protocols of various mobile device carriers 226. The carriers 226 may also maintain user profile information in one or more databases 228–230. The LBS application 210 may also maintain an LBS database 232 for the local storage of information. Further, the API 222 provides an interface for refining the location of a device using fuzzy logic.

Generally, components 204–232 all comprise logic and/or data that is embodied in or retrievable from a device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Mobile Device Locator Adapter System

A device locator application may be executing on a client 204 or a server 206 to determine the location of a specific mobile device client 204. Details regarding such an application are disclosed in the co-pending and commonly assigned U.S. patent application Ser. No. 10/073,805, entitled "MOBILE DEVICE LOCATOR ADAPTER SYSTEM FOR LOCATION BASED SERVICES", by Nemmara Chithanibaram, er. al, filed on the same date herewith, which application is incorporated by reference herein.

A device locator application may be executing on a client 204 or a server 206 to determine the location of a specific mobile device client 204. To determine the location of a mobile device client 204, a device-specific identification is provided to the device locator. For example, a mobile subscriber international subscriber directory number (MSISDN) (the directory number [e.g., the GSM—global system for mobile communications number] or the number one dials to connect to a GSM subscriber) may be provided to a device locator application 210. Such an MSISDN may be encoded in a cookie in a wireless application request. Alternatively, a device may be identified by an Internet protocol (IP) address encoded in a request header or may be identified by a pre-stored default in the user profile database 228–230.

The resulting location provided by the device locator 210 contains the coordinates of the device 204, the device's 204 spatial reference system (SRS), and information regarding the precision of the coordinates.

The device locator 210 provides an interface 222 for accessing the network-provided location of a device 204. For devices 204 that provide their own location (such as via a SIM card), the application developer already has the coordinates of the device 204 and does not need to use the device locator 210.

The device locator 210 provides users with a unified API 222 for determining the location of devices 204. The device locator 210 retrieves the location of devices 204 from third-party location determination technology (LDT) providers 226, each of which may support different protocols (e.g., HTTP, HTTPS, etc.). LDT is a general term that describes a carrier network based service that provides device 204 location information to internal and external systems. LDT adapters 224 may be supplied by specific carriers 226 and may be utilized to provide the location information. Any location obtained from a source other than the supplied LDT adapters 224 may still be used throughout GIS applications in any application programming information (API) call that requires a location parameter. As described above, LDT providers/carriers 226 may each support different protocols that may vary with respect to the format of the request, the format of the response, and the accuracy of the response. Some services may only provide a geographic region that the mobile system is within, while others may provide specific coordinates.

The device locator interface (i.e., the API) 222 insulates application code from the specific APIs of individual LDT providers 226. Application developers do not need to understand provider APIs or protocols. Instead, an LDT adapter 224 translates specific provider APIs into a generic API 222 that is presented to the application as the device locator 210. The LDT adapter 224 therefore insulates the application from differences in protocols like hypertext transfer protocol (HTTP), secure hypertext transfer protocol (HTTPS), etc. Such an architecture may also support additional LDT providers 226 in the future without changing the application API 222. An LDT adapter 224 simply needs to be written for the new LDT provider 226.

Figure 3:
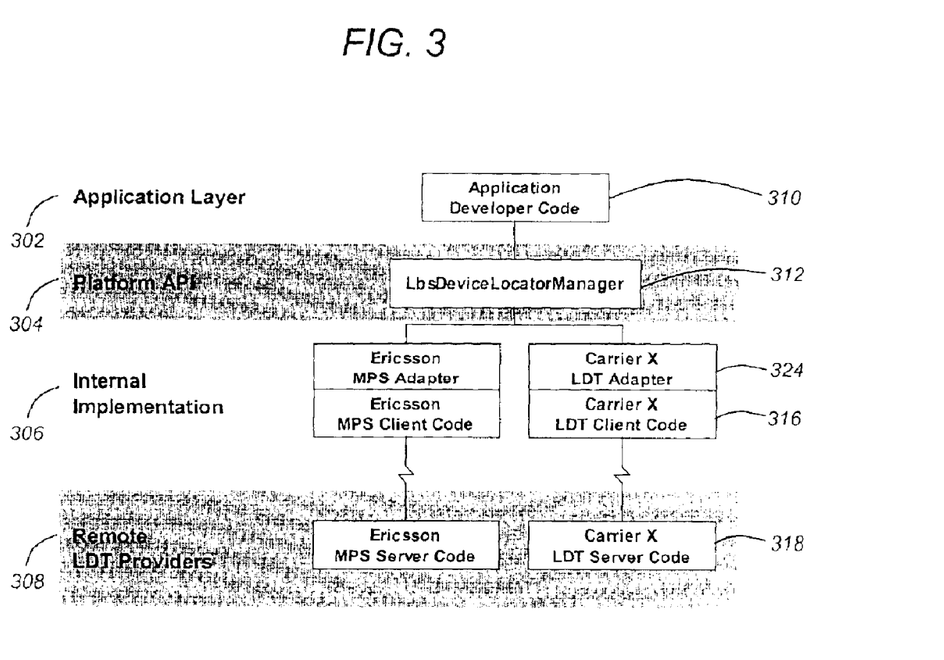
FIG. 3 illustrates a simple representation of an architecture that supports a device locator in accordance with one or more embodiments of the invention.

FIG. 3 illustrates a simple representation of an architecture that supports a device locator 210 in accordance with one or more embodiments of the invention. As illustrated, the architecture has several layers 302–308. Application code 310 in application layer 302 interfaces through the uniform API 222 with a device locator 312 (e.g., LbsDeviceLocatotManager) in the platform API layer 304 to obtain location information for a device 204.

The device locator 312 interfaces with individual carrier protocols set forth in specific carrier LDT adapters 324 in internal layer 306 to retrieve location information using carrier specific implementations. The carrier LDT adapters 324 interact with client code 316 that communicates with server code 318 in the remote LDT provider layer 308.

To query the location of a device 204, the application code 310 retrieves an instance of a device locator object 312 (e.g., LbsDeviceLocatorManager). The application code 310 may then use the device locator 312 to obtain the location of a device 204 given a device's id. As described above, the format of device ids may vary according to the LDT implementation. If a query for the location of a device 204 fails, the device locator 312 may generate an exception.

If the query is successful, a location object may be returned to application layer 302. As described above, the resulting location object may contain a Point/Coordinate object containing the coordinates representing the device's location, an SRS object that describes the associated spatial reference system, and a Precision object that describes the precision of the coordinates.

In one or more embodiments of the invention, a device locator manager provides the API 222 and delegates calls to specific get location methods implemented for/by individual carriers 226. To ensure that the individual carriers 226 implement such a get location method, an interface (e.g., a devicelocator interface) may be implemented by all specific device locator adapters 224.

Adapter System Flow

Figure 4:
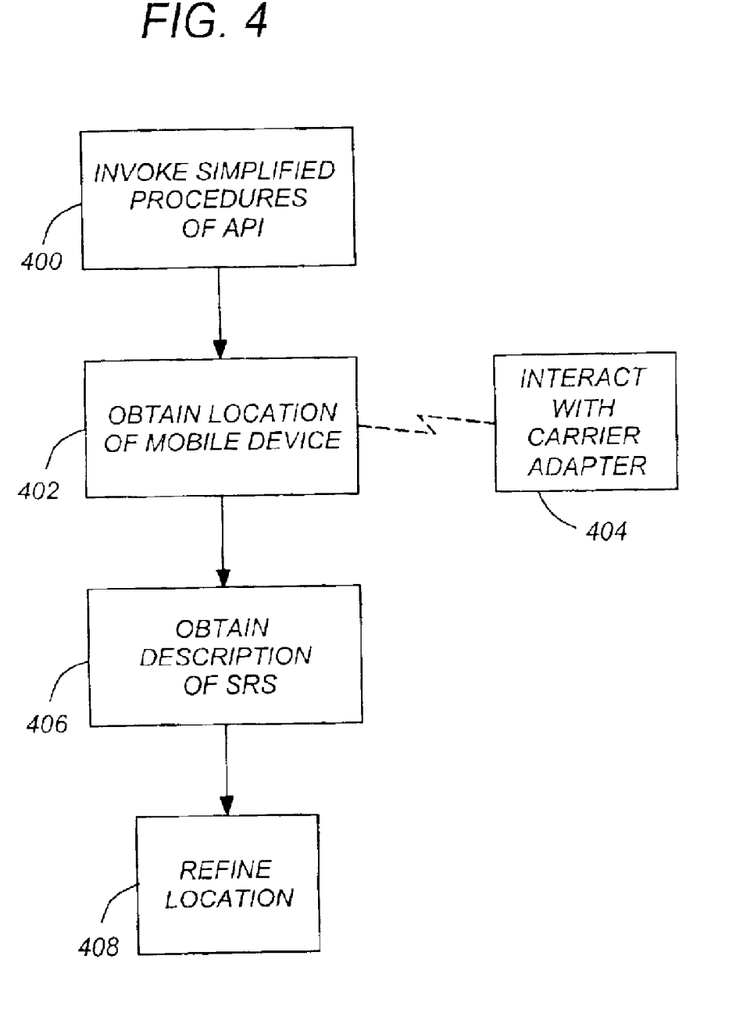
FIG. 4 is a flow chart that illustrates the use of an application programming interface in a mobile device locator adapter system in accordance with one or more embodiments of the invention.

FIG. 4 is a flow chart that illustrates the use of an API in a mobile device locator adapter system 200 in accordance with one or more embodiments of the invention. Referring to both FIG. 2 and FIG. 4, in the mobile device locator adapter system 200 an application program 210 (i.e., a device locator) may be dynamically deployed within a computer system 200 without deploying a new version of the computer system 200.

Once the application program 210 has been deployed, simplified procedures of an API 222 of the application program 210 may be invoked at step 400. The simplified procedures obtain the location of the mobile device 204 at step 402 (e.g., using an identification of the mobile device 204). To obtain the location, the invoked procedures interact with the carrier adapter 224 at step 404. Since the carrier adapter 224 is customized for a particular carrier 226, specific information and methods may be utilized. For example, the invoked procedures may interact with the specifics for a mobile positioning server of the carrier 226 and different methods of identifying the device 204 as required by the carrier 226. Additionally, the invoked procedures may obtain the spatial reference system associated with the location of the device 204 at step 406.

The location of the mobile device 204 obtained at step 402 may comprise a cellular phone number, an MSISND, an Internet protocol address encoded in a request header or a pre-stored default. Further as described above, by interacting with one or more carrier adapters 224 at step 404, the invoked procedures interact with different protocols provided by the carriers 226.

Once the location has been obtained at step 406, the location may be further refined at step 408. To refine the location, one or more heuristics may be applied. For example, the location may be snapped to a closest point on a street network, to a landmark or point of interest in the vicinity, to a location in the vicinity of the location the mobile device user has recently visited (by examining the user's "history"), or to a location in a vicinity of the location that the mobile device user has bookmarked as a "favorite" location. Alternatively, fuzzy logic may be used to refine the location of the device 204.

Location Refinement

Once a location for a device 204 has been obtained, one or more embodiments of the invention may refine the approximate location by applying fuzzy logic. A user or application may specify when such a location refinement is to occur. For example, a boolean "REFINE" value may be set to TRUE if refinement is desired. Accordingly, once a location is identified (as described above), the boolean value may be examined to determine if further refinement should be performed.

A user may be permitted to specify the desired methodology for refining the location of a device 204. Such different methodologies may be specified by configuring a set of rules used in the refinement process. Further, such rules may be stored in a table in a rule configuration file. The different methodologies may include snapping the location to the closest point on the street network, a landmark, or a "point of interest" in the vicinity. Alternatively, the application may look for locations in the vicinity of the approximate location that the mobile device user has recently visited (i.e., studying the "history" in the user profile) and snapping the location to a particular location (e.g., the closest location last visited). Further, the application may examine "favorite" locations bookmarked by the mobile device user and determine if any such "favorite" locations are in the vicinity of the approximate device location. The approximate location may then snap to the closest "favorite" location. Further, fuzzy logic may be utilized to refine the location as described in detail below.

For example, in a simple approach to location refinement, the geometric centroid of a precision polygon shape f(x,y) is defined by:

$$x = \text{DoubleIntegral}(x \, dx \, dy)/\text{DoubleIntegral}(dx \, dy); \text{ and}$$

$$y = \text{DoubleIntegral}(y \, dx \, dy)/\text{DoubleIntegral}(dx \, dy)$$

Using such a definition for a geometric centroid, trivial refinement of a precision polygon (e.g., polygon 102) is provided. However, the centroid does not really refine the location. Nonetheless, such a centroid may offer the best average error for a uniform distribution of the true location within the precision polygon 102.

In another example of location refinement, a user's profile and regional content is used to influence the refinement. In such refinement, a wireless carrier 226 profile database 228–230, a wireless portal (e.g., an adapter 224) and a local user profile database (e.g., LBS database 232) will together have access to very specific user profile information. Such access may be provided as described in co-pending and commonly assigned U.S. patent application Ser. No. 10/034,440, entitled "LOCATION BASED SERVICES BRIDGE TO EXTERNAL DATA SOURCES", by Nemmara Chithambaram, et. al, filed on the same date herewith.

This information may get progressively richer and more precise with increased usage of LBS services or an LBS application 210. The data obtained through further use of an LBS application 210 may offer insights related to the user's general demographic, ethnic classification, the user's locational pattern (e.g., home, office, favorite locations), and/or the user's "current activity profile" based on the history of locations visited recently and/or recently executed queries (e.g., "find closest museum").

Further such profile information may also be used to answer questions such as whether the user in the vicinity of a bookmarked favorite location or whether the user in the vicinity of a location recently recorded in the location history. If one of these conditions turns out to be true, a favorite location or a location in the user profile location history as a candidate for the refined location may be easily offered.

However LBS services are more commonly used when the user is away from home or work, and often in an unfamiliar area. In such cases, a prominent landmark(s) or point(s) of interest in the vicinity may be offered as candidates for the refined location(s). Further, the category of landmark or point of interest selected could depend on "intelligently guessing" the user's "current activity profile" based on inputs from the user profile and local content database 232. Such inputs may comprise a combination of locational aspects (e.g., where are the user's favorite routes), activity profile indicator(s) (e.g., is this is a business visitor? Or the last finder query was "find closest museum"), and/or a temporal aspect (e.g., how late are the typical visitor attractions open in this region?)

Additionally, a user's preferences may be inferred to deliver highly personalized services tailored to a user. For example, everything from application behavior to stylizing for the filtering of content may be personalized for a particular user.

To refine the approximate location of a device 204, a location refinement manager may be utilized. The location refinement manager may be the initial point for location refinement, and a method of the location refinement manager may return a single refined location (e.g., a best guess), a sorted list of refined candidate locations, or several lists of refinement candidates classified by source (e.g., user profile favorites, user profile history, visitor landmarks, etc.). Each list of refined locations may be based on the particular refinement performed. For example, one list may be based on favorites, a second list may be based on the history, while a third list may be based on landmarks. Further, each list may be sorted based on their distance from the centroid or approximate location.

Once the list of lists of refined locations is obtained, a user may interact with the LBS application 210 to compute the user's exact location. This interaction may for example include a simple confirmation of the refined location, allow selection from the candidate list, or the use of one or more candidate locations to orient and locate the user's true location. Further, during this process, all of the lists may be resolved into a single list. For example, each location in each list may be combined into a single list sorted by distance from the centroid. Additionally, the individual lists or single resolved lists may be filtered such that only locations within a specified polygon are returned. Further, based on the individual lists or single resolved list, a single refined list may be returned. Accordingly, depending on the implementation of the location refinement manager, the user may be presented with a single refined location, a list of refined locations, or a list of lists of refined locations. Nonetheless, the location refinement manager permits the approximate location of a device 204 to be refined based on various factors that may be selectable by a user.

Fuzzy Logic Refinement

One or more embodiments of the invention provide a method, apparatus, and article of manufacture for refining a device location using fuzzy logic. The fuzzy logic refinement process may be initialized by the location refinement manager.

Many reasons exist for utilizing fuzzy logic to refine a device's location. To provide the most benefit, some questions and information may be necessary. For example, necessary information may include whether the current activity profile matches a commuter profile, a business visitor profile, a leisure visitor profile, more than one of these profiles, or none of the profiles. However, many problems may arise with answering such questions. For example, the definition of the problem may be vague. In other words, the problem may be ill suited for precise quantitative definition (non-quantitative terms such as in the vicinity of, close to, far away from, likely, etc. may be frequently used). Also, it may be difficult to determine when a certain category of landmarks for the refined location should be used (subjective question). Additionally, boundaries may be blurry. For example, the answer to the question, "Does the current activity match the profile of leisure visitor?" could be "May be" or "Uncertain" vs. a "Yes/No". Further, inputs may be imprecise, conflicting, and/or overlapping. For example, the current activity profile could represent a business visitor spending an evening of leisure.

These problems call for a system that manages the vagueness, imprecision and blurry boundaries intrinsic to the input. Further, a system should formalize how such imprecision and conflicting information will be captured and processed, allow the progressive reflection of an increased understanding of the problem (with increased usage and deployments), and offer a definite conclusion.

One or more embodiments of the invention utilize a branch of artificial intelligence (AI) referred to as fuzzy logic to solve such problems. Fuzzy logic is a superset of conventional (Boolean) logic that has been extended to handle the concept of partial truth—truth values between "completely true" and "completely false".

With fuzzy logic, continuous truth values are permitted such that system variables may take a continuous range of truth-value memberships in the interval [0,1], rather than strict binary (True or False) decisions and assignments. For example, if it is cloudy and overcast, the statement "it is raining" could have a True value of 0.8, and a False value of 0.25. Likewise, the statement "The current user is a visitor" has the value 0.9 if highly likely, 0.1 if highly unlikely, and 0.5 if the answer is "may be".

Figure 5:
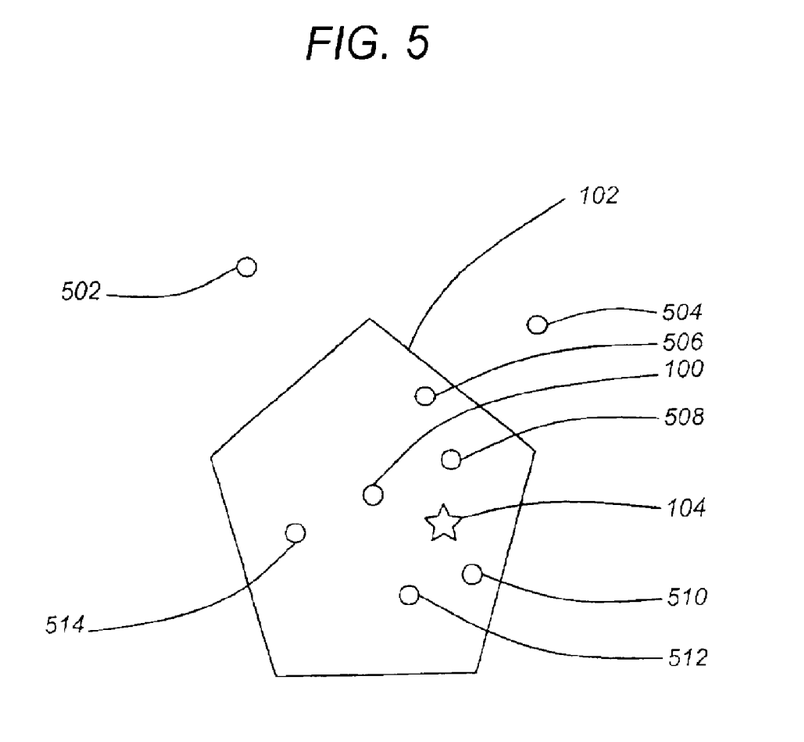
FIG. 5 illustrates a refined location as the fuzzy centroid of weighted inputs in accordance with one or more embodiments of the invention.

Using fuzzy logic, the location refinement problem may be redefined. Such a redefinition of the problem may be depicted in FIG. 5 which illustrates a refined location as the fuzzy centroid of weighted inputs. In FIG. 5, the location precision polygon 102 contains a geometric centroid 100 given as the approximate device 204 location. The refined location 104 may be selected from a variety of different possibilities 502–514. However, the various different possibilities 502–514 may be weighted and combined to determine a refined location as the fuzzy centroid 104.

Various fuzzy membership sets 502–514 may be utilized and weighted to refine the location. Different types of fuzzy membership sets 502–514 may be utilized in the weighting calculation. For example, fuzzy membership sets 502–514 may be utilized for proximity to various categories of user profile locations (e.g., the closest user profile favorites 502, user profile history 504, etc.). Additionally, fuzzy membership sets 502–514 may describe the current activity (e.g., business visitor profile, commuter profile, leisure visitor profile, etc.), and by extension, weighted proximities to different kinds of landmarks (e.g., the closest lodging landmark 506, the closest visitor landmark 508, the closest business landmark 510, the closest street intersection 512, the closest commuter landmark 514, etc.).

Based on the fuzzy membership sets, the refined location may be inferred as a fuzzy centroid 104 of these weighted inputs.

The fuzzy logic reasoning of the present invention permits a variable number of imprecise inputs such that any number of precise or imprecise inputs/input sensors are allowed. For example, one or more of the following may be used as input sensors to refine a device's location: proximity to favorites, business visitor profile indicator, leisure visitor profile indicator etc.

The fuzzy logic reasoning of the invention includes a rule-base that defines a set of (intuitive) rules that define input/output relationships in the form:

If X and Y then Z

For example, one or more of the following rules may be defined within a rule base of the invention: If (close to local favorite location) then Closest Favorite; or If (far away from favorites) and (current activity matches visitor landmark) then Closest Visitor Landmark.

Membership functions define the magnitude of participation of each input in determining the location. For example, a membership function may evaluate the question of whether the current activity profile matches a leisure visitor profile. An answer of "most likely" results in a higher membership function and a greater participation in location determination, vs. an answer of "could be".

Lastly, the fuzzy logic reasoning of the invention includes an inference engine that computes the logical product of each of these rules. For example, an inference engine may determine the logical product as:

X AND Y=MIN (X, Y)

X OR Y=MAX (X, Y)

The logical product is then combined to produce the final answer.

Figure 6:
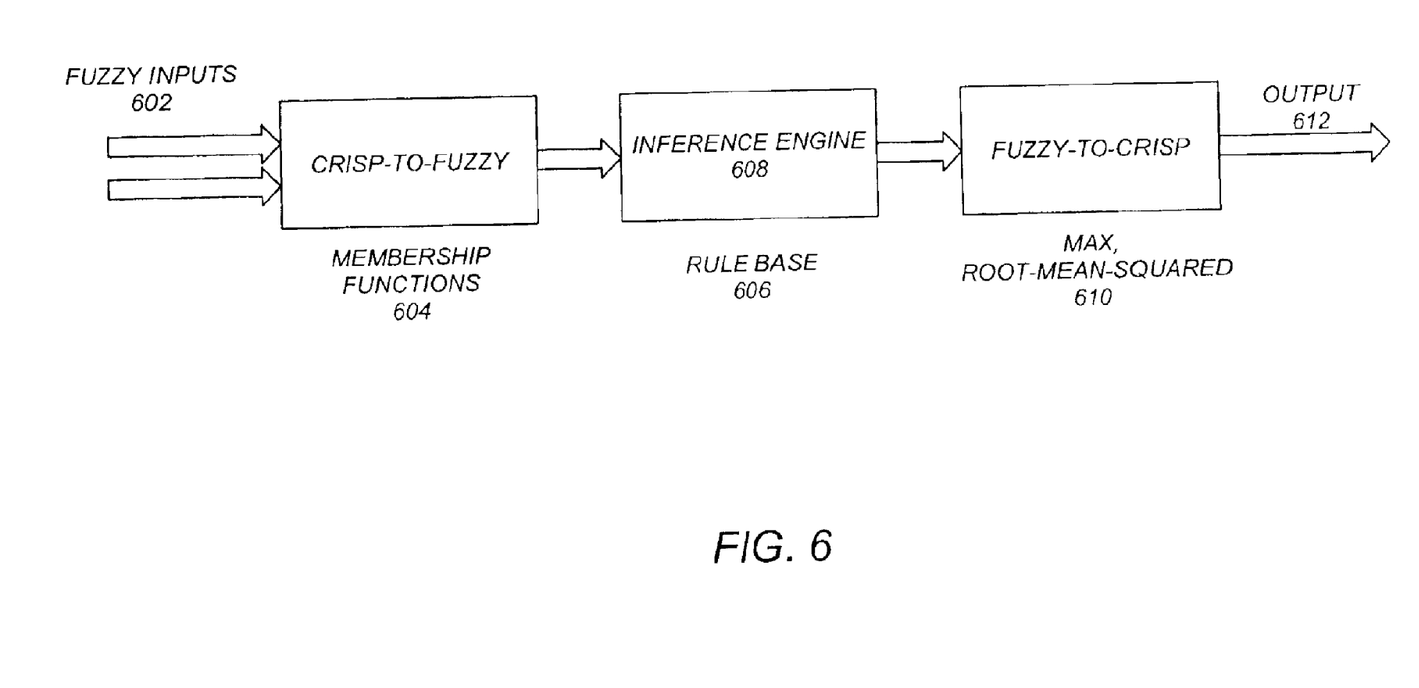
FIG. 6 illustrates the processing of fuzzy inputs using fuzzy logic reasoning in accordance with one or more embodiments of the invention.

FIG. 6 outlines the fuzzy logic reasoning process in accordance with one or more embodiments of the invention. As illustrated, fuzzy inputs 602 (i.e., a variable number of imprecise inputs) are processed by one or more membership functions 604 that define the magnitude of participation of each input 602. Subsequently, a rule base 606 (containing one or more rules) is processed by an inference engine 608 where the logical product for one or more rules are computed. The logical products provide the level of truth (i.e., a value in the interval [0,1]) for each rule. The inference engine then selects the refined location using one or more different methods. For example, the maximum logical product or root-mean-squared values 610 may be utilized to determine the appropriate final output 612 (i.e., refined location). Thus, fuzzy inputs 602 go from a crisp form to a fuzzy form (when processed by membership functions 604) where they are processed by an inference engine 608 that identifies logical products that are then processed back into a crisp form by using a desired methodology 610 for selecting the appropriate logical product and the corresponding refined location for output 612.

Three types of input sensors (fuzzy inputs 602) may be utilized: location or proximity based, time based, and activity profile based. Location or proximity based inputs 602 determine the proximity to particular locations. For example, location based inputs 602 may include favorites (e.g., proximity to user profile favorites like home, office, health club, etc.) and history (e.g., proximity to recently visited locations in the user profile history).

Activity profile based inputs 602 are evaluated to determine whether the current user's activity matches or is similar to a particular established profile. For example, established profiles may include a business visitor activity profile (e.g., does the current activity match the profile of a business visitor?), a leisure visitor activity profile (e.g., does the current activity match the profile of a leisure visitor?), and a commuter activity profile (e.g., does the current activity match the profile of a commuter?).

Temporal inputs 602 are based on whether the current time is within a particular temporal range or profile. For example, a business operating hour temporal input 602 may determine if the current time is within the business operating hours. Alternatively, a leisure operating hour temporal input 602 may determine if the current time is within the leisure operating hour.

Other spatio-temporal inputs 602 such as velocity vector (indicating a direction of travel) may be added/utilized as an input 602.

The fuzzy logic then processes the inputs 602 to produce an output 612. The output 612 may comprise a single value or a set of values (if multiple candidates are required). Outputs may include the closest favorite location 502, the closest history 504, the closest leisure landmark 508, the closest business landmark 510, the closest lodging landmark 506 (e.g., a hotel), the closest commuter landmark 514, the closest street intersection 512, etc.

Membership functions 604 are utilized to define the magnitude of participation of each input. In other words, a membership function 604 makes an evaluation of an input 602 and determines how much that input 602 is used in the inference engine 608.

A three-valued set may be used for each input/ membership function 604: P or positive (+) for truth-values, N or negative (−) for false-values, and Z or zero (0) for values that can go in either direction or reflect uncertainty. Each set can take values from the closed set/interval [0,1].

For example, an input function LeisureVisitotActivityProfile can be fuzzified as follows:

Most likely leisure visitor→P=0.8

Unlikely leisure visitor→N=0.8

May or may not be (uncertain)→Z=0.8

Similarly, P, N, and Z values may be defined for all other inputs 602 (e.g., near=P, far=N, uncertain=Z). Table 1 is an example of an input membership table that may be used to store the different values for input 602 participation.

TABLE 1

| INPUTS | N [0–1] | Z [0–1] | P [0–1] |
|---|---|---|---|
| ProximityToFavorites | | | |
| ProximityToHistory | | | |
| BusinessVisitorProfile | | | |
| LeisureVisitorProfile | | | |
| CommuterProfile | | | |
| BusinessOperatingHour | | | |
| LeisureOperatingHour | | | |

The membership functions 604 populate the table with the appropriate values for P, N, and Z. Subsequent to processing the inputs 602 through the membership functions 604, the inputs 602 are processed by an inference engine 608 against a rule base 606 in accordance with the magnitude of participation (i.e., the P, N, and Z values) provided by the membership functions 604. Since the rule base 606 is merely applied by the inference engine 608, the rule base 606 can be progressively refined as more empirical data is gathered. Further, a default rule may be specified. The default rule is used if/when the inference engine 608 cannot produce a result due to conflicting rules or inputs 602. Thus, the rule base 606 is fail-safe. If the fuzzy reasoning fails to yield a result due to too many conflicting inputs 602, the default rule would be applied (e.g., answering closest street intersection if the default rule so provides).

Additionally, to experiment on the output 612 produced based on varying rules and input 602, the inclusion and exclusion of rules may be influenced for experimentation. For such experimentation, embodiments provide that the rules use logical products and that only non-zero logical products contribute to the final inference. For example, if the membership function 604 produces P, N, and Z values that are zero, the inputs 602 have no magnitude and cannot participate in the rules. Further, since logical operations are performed, if a zero value were used, the product result in a rule would also be zero (thereby producing an improper output 612). Accordingly, initializing a value of 0.0 for the P, N and Z values of a function 604, excludes the rule from contributing in as a result of the logical product rule (since 0.0 and X=0.0).

Additionally, the number of rules, complexity of rules, and the inference engine 608 may be configured (e.g., adaptive to different parts of the world, or for a richer user profile database). Table 2 illustrates a rule base 606 table comprising rule numbers, antecedents, and consequents for a rule base 606.

TABLE 2

| Rule | If (antecedent) | Then (consequent) |
|---|---|---|
| 1. | ProximityToFavorites = P | ClosestFavorite E.g., Home |
| 2. | ProximityToFavorites = (N OR Z), and ProximityToHistory = P | ClosestHistory, E.g., Last location in history |
| 3. | ProximityToFavorites = (N OR Z), and ProximityToHistory = N OR Z, and BusinessVisitorProfile = P, and BusinessOperatingHour = P | ClosestBusinessLandmark E.g., Civic Center |
| 4. | ProximityToFavorites = (N OR Z), and ProximityToHistory = (N OR Z), and LeisureVisitorProfile = P, and LeisureOperatingHour = P | ClosestLeisureLandmark E.g., Stafford Lake Park |
| 5. | ProximityToFavorites = (N OR Z), and ProximityToHistory = (N OR Z), and BusinessVisitorProfile = P, and BusinessOperatingHour = N | ClosestLodgingLandmark E.g., The Sheraton |
| 6. | ProximityToFavorites = (N OR Z), and ProximityToHistory = (N OR Z), and LeisureVisitorProfile = P, and LeisureOperatingHour = N | ClosestLodgingLandmark E.g., The Sheraton |
| 7. | ProximityToFavorites = (N OR Z), and ProximityToHistory = (N OR Z), and CommuterProfile = P | ClosestCommuterLandmark E.g., Richmond Bart Station |
| 8. | ProximityToFavorites = (N OR Z), and ProximityToHistory = (N OR Z), and BusinessVisitorProfile = (N OR Z), and LeisureVisitorProfile = (N OR Z), and CommuterProfile = (N OR Z) | ClosestStreetIntersection E.g., Civic Center At McInnis |

Table 2 illustrates how the values in the input membership table (i.e., Table 1) are utilized in a set of rules. For example, in rule 3, four conditions are processed based on the inputs 602 to produce the closest business landmark. The four rules use logical AND operations to evaluate the antecedent rules. In rule 3, the closest business landmark is the consequent (i.e., the output 512) if proximity to favorites is N or Z, proximity to history is N or Z, the business visitor profile is P, and the business operating hour is P. The additional rules each have a set of antecedents/conditions that produce a particular consequent when combined.

Once the rule base 606 has been established (e.g., placed into a rule base table), the inference engine 608 is used for computing the fuzzy centroid 104. When using the inference engine 608, the logical product of each rule (e.g., rule 1 through 8 of Table 2) is processed. This processing yields a value between 0 and 1 for each rule. When processing logical products, the antecedent "X and Y and Z" is equivalent to the minimum of X, Y, and Z (i.e., MIN (X, Y, Z)). Similarly, the antecedent "X or Y or Z" is equivalent to the maximum of X, Y, and Z (i.e., MAX (X, Y, Z)). The logical product for each rule (with a value in the interval [0, 1]) indicates the magnitude of participation of that rule (0 indicating no participation). The inference can use different methods of computing the weighted centroid 104 of the non-zero magnitude rules including picking the MAX, averaging or using root mean squared 610.

In one or more embodiments, the MAX rule is always utilized so that the rule with the highest logical product is selected. For example, if rule 5 (of Table 2) yields the highest logical product, say 0.9, the refined location would be the Closest Lodging Landmark.

Further, when applying rules, if multiple candidates or multiple lists are required, the first n elements from the highest 2 or 3 logical products are selected. For example, if rules 5 and 7 (of Table 2) yield the highest values, then two lists that represent the Closest Lodging Landmarks and the Closest Commuter Landmarks may be provided as refinement candidates.

Example Application of Fuzzy Logic Refinement

Example 1 (Simple)

In a simple example, the user may not be very close to any favorite locations but is very close to a location in the user's profile history. In such an example, the input membership table has the values as illustrated in Table 3.

TABLE 3

| INPUTS | N (0–1) | Z (0–1) | P (0–1) |
|---|---|---|---|
| ProximityToFavorites | 0.9 | 0 | 0.1 |
| ProximityToHistory | 0 | 0 | 0.8 |
| BusinessVisitorProfile | 0 | 0 | 0 |
| LeisureVisitorProfile | 0 | 0 | 0 |
| CommuterProfile | 0 | 0 | 0 |
| BusinessOperatingHour | 0 | 0 | 0 |
| LeisureOperatingHour | 0 | 0 | 0 |

In this example, the only rules in the rule table that yield a non-zero logical product are rules 1 and 2 as illustrated in Table 4.

TABLE 4

| Rule | If (antecedent) | Logical Product | Then (consequent) |
|---|---|---|---|
| 1. | ProximityToFavorites = P | 0.1 | ClosestFavorite E.g., Home |
| 2. | ProximityToFavorites = (N OR Z), and ProximityToHistory = P | 0.9 and 0.8 = 0.8 | ClosestHistory, E.g., Last location in history |

Using the Max rule (i.e., taking the rule with the highest logical product), rule 2 prevails and the output 612 for the refined location is the closest history (e.g., the last location in the user's history). The closest history is the expected answer:

Example 2

In this example, the user is far away from favorites, far away from history, the current activity profile suggests the user matches a business visitor profile, the current activity profile suggests that the user could also possibly match a leisure visitor pro file, and the time of day is 8.00 p.m. on a weekday.

Processing these values in membership functions 604 might result in the value for the input membership function of Table 5.

TABLE 5

| INPUTS | N (0–1) | Z (0–1) | P (0–1) |
|---|---|---|---|
| ProximityToFavorites | 1.0 | 0 | 0 |
| ProximityToHistory | 1.0 | 0 | 0 |
| BusinessVisitorProfile | 0 | 0 | 0.8 |
| LeisureVisitorProfile | 0.3 | 0.5 | 0.6 |
| CommuterProfile | 0 | 0 | 0 |
| BusinessOperatingHour | 0.9 | 0 | 0.2 |
| LeisureOperatingHour | 0.2 | 0.4 | 0.7 |

The non-zero magnitude rules for these membership values, and their logical products are shown in Table 6 below:

TABLE 6

| Rule | If (antecedent) | Logical Product | Then (consequent) |
|---|---|---|---|
| 3. | ProximityToFavorites = (N OR Z), and ProximityToHistory = (N OR Z), and BusinessVisitorProfile = P, and BusinessOperatingHour = P | 1.0 and 1.0 and 0.8 and 0.2 = 0.2 | ClosestBusinessLandmark E.g., Civic Center |
| 4. | ProximityToFavorites = (N OR Z), and ProximityToHistory = (N OR Z), and LeisureVisitorProfile = P, and LeisureOperatingHour = P | 1.0 and 1.0 and 0.6 and 0.7 = 0.6 | ClosestLeisureLandmark E.g., Stafford Lake |
| 5. | ProximityToFavorites = (N OR Z), and ProximityToHistory = (N OR Z), and BusinessVisitorProfile = P, and BusinessOperatingHour = N | 1.0 and 1.0 and 0.8 and 0.9 = 0.8 | ClosestLodgingLandmark E.g., The Sheraton |
| 6. | ProximityToFavorites = (N OR Z), and ProximityToHistory = (N OR Z), and LeisureVisitorProfile = P, and LeisureOperatingHour = P | 1.0 and 1.0 and 0.6 and 0.7 = 0.6 | ClosestLodgingLandmark E.g., The Sheraton |

The highest logical products are for rules 5 and 4. Therefore the candidates for refinements for this example will include the Closest Lodging Landmark and the Closest Leisure Landmark.

Advantages and Benefits

The use of fuzzy logic reasoning to refine a device 204 location deals with the many uncertainties related to both the inputs for location and refinement, and the rules used to compute the refinement. Further, fuzzy logic reasoning provides formal constructs for representing (fuzziness) imprecise/vague/overlapping/conflicting inputs. Also, fuzzy logic reasoning provides the best guess (for applications that want to minimize the user interaction) or several prioritized candidate lists.

Additionally, as described herein, the fuzzy logic reasoning model is adaptive. In other words, the model allows the complexity of the inference to be controlled. For example, turning down the inferences in rules 3–7, provides a simple model (that only uses proximity to favorites, locations in history, and defaults to ClosestStreetlntersection). On the other hand, the rules can be easily fine tuned to provide further information such as regional information.

The rule-base 606, and the inference engine 608 can be implemented in phases (starting with the simplest). Further, the processing allows inputs to be taken from the carrier profile databases 228–230, and the locational information to infer user preferences and influence application behavior, filtering of content, etc. The use of the carrier profile databases 228–230 helps provide highly personalized applications tailored to the user's profile and location. Additionally, the value of the profile information collected by carriers increases by using it to personalize application behavior.

Fuzzy Logic Reasoning Flow

Figure 7:
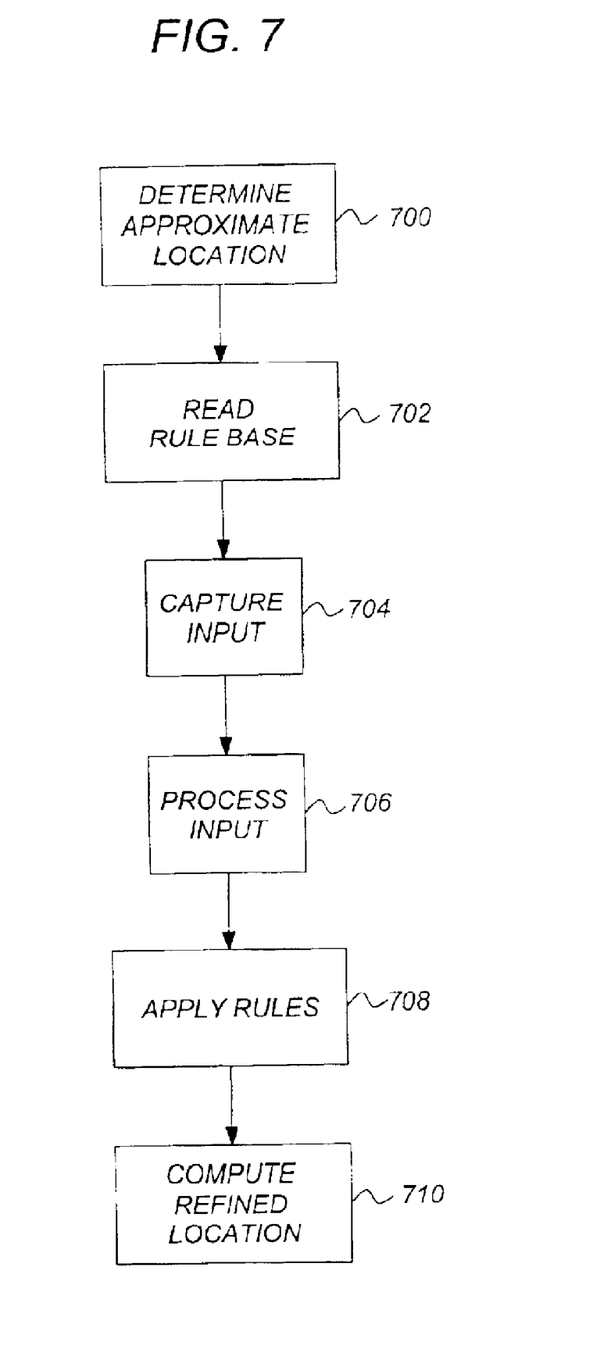
FIG. 7 is a flow chart illustrating the use of fuzzy logic reasoning to refine a device location in accordance with one or more embodiments of the invention.

FIG. 7 is a flow chart illustrating the use of fuzzy logic reasoning to refine a device 204 location in accordance with one or more embodiments of the invention. At step 700, the approximate location of a device is determined. At step 702, a rule base 606 that comprises an ordered collection of rules is read into memory or loaded from a database (e.g., database 232). The rule base 606 may be progressively refined based on empirical data collected over time. Further, the rule base 606 may specify a default rule to use if the reasoning fails to produce a result. Additionally, the rule base 606 may be adaptable such that it may be configured to reflect regional trends, social trends, or demographic trends. Such adaptability may be user controlled wherein the user is permitted to add, delete, and edit the rule base to customize/personalize the reasoning.

The rules within the rule base 606 are defined by an antecedent with one or more conditions, and a resulting consequent. Further, the antecedent may utilize or process a logical product.

At step 704, a variable number of imprecise inputs/input sensors are captured. As described above, three types of input sensors are typically used: locational, activity profile based, and temporal based. Additionally, spatio-temporal inputs may be used.

At step 706, the input is processed in one or mote membership functions. Membership functions define the magnitude of participation of each input in the rules. In accordance with fuzzy logic reasoning, the magnitude of participation may be within an interval from 0 to 1 ([0,1]). The membership function may define a three-valued set for each input. Such a three-valued set may comprise a truth value, a false value, and an uncertainty value (each of which are defined along the interval [0,1]).

At step 708, the rules are applied to the input based on the magnitude of participation to produce a logical product for each rule. Using fuzzy logic reasoning of the invention, the logical product may comprise a truth value between 0 and 1 that represents the applicability of the consequent. The consequent specifies/describes a refined location (e.g., closest leisure landmark, closest lodging landmark, etc.). Accordingly, the antecedent utilizes the various input values (as processed by the membership functions) to produce a logical product that represents the truth of a consequent.

At step 710, the refined location is computed based on the logical products. In other words, now that various truth values/logical products have been specified at step 708, a determination is made as to which consequent to utilize as the actual refined location (also referred to as the weighted centroid 104). As described above, different methods of computing the refined location based on the logical products may be used. For example, the maximum logical product may be selected and the corresponding consequent may then be selected/used to determine the refined location. Alternatively, averages (e.g., a root-mean-squared calculation) may be used to refine the location. For example, the logical products may be averaged and the consequent with the logical product that is closest to the average may be selected as the refined location. Alternatively, a number of different candidate locations may be used and a location between all of those locations may be provided. However, any available method for selecting a refined location (or list of refined locations) may be used. Additionally, the refined location that is returned may either comprise a singleton (i.e., a single refined location) or a list of candidate locations that the user may select from.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, or any type of mobile device such as a cellular phone, laptop computer, personal digital assistant, etc. could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for refining a location of a device comprising:
   (a) determining an approximate location of a device;
   (b) reading a rule base that comprises an ordered collection of rules;
   (c) capturing an imprecise input, wherein the imprecise input is based on:
      (i) a proximity to a particular user identified location;
      (ii) a similarity between a current user's activity and a particular established activity profile; or
      (iii) whether a current time is within a particular temporal range or temporal profile;
   (d) processing the imprecise input to determine a magnitude of participation of the input in the rules;
   (e) applying the rules to the imprecise input based on the magnitude of participation to produce a logical product; and
   (f) computing a refined location based on the logical product.

2. The method of claim 1 further comprising:
   gathering empirical data; and
   progressively refining the rule base based on the empirical data.

3. The method of claim 1 wherein the rule base provides a default rule.

4. The method of claim 1 wherein the rule base is configured to reflect regional trends, social trends, or demographic trends.

5. The method of claim 1 wherein one of the rules utilizes a logical product in an antecedent to determine a consequent.

6. The method of claim 1 wherein the imprecise input is spatio-temporal.

7. The method of claim 1 wherein the magnitude of participation is within an interval [0,1].

8. The method of claim 1 wherein a three-valued set is defined for each imprecise input, wherein the three-valued set comprises a truth value, a false value, and an uncertainty value.

9. The method of claim 1 wherein the logical product of each rule comprises a value between 0 and 1.

10. The method of claim 1 wherein the refined location is computed by:
    selecting the rule with the highest logical product; and
    using a consequent corresponding to the selected logical product as the refined location.

11. The method of claim 1 wherein the refined location comprises a list of candidate locations.

12. The method of claim 1 wherein the particular user identified location comprises a user identified favorite location.

13. The method of claim 1 wherein the particular user identified location comprises a recently visited location of the current user.

14. The method of claim 1 wherein the refined location comprises a list of lists of candidate locations.

15. An apparatus for refining a location of a device comprising:
    (a) a computer having a memory;
    (b) an application executing on the computer, wherein the application is configured to determine an approximate location of a device;
    (c) an inference engine executing on the computer, wherein the inference engine is configured to:
       (i) read a rule base that comprises an ordered collection of ruler;
       (ii) capture an imprecise input, wherein the imprecise input is based on:
          (1) a proximity to a particular user identified location;
          (2) a similarity between a current user's activity and a particular established activity profile; or
          (3) whether a current time is within a particular temporal range or temporal profile;
       (iii) process membership functions stored in the memory of the computer, wherein the membership functions define a magnitude of participation of the input in the rules;
       (iv) apply the rules to the imprecise input based on the magnitude of participation to produce a logical product; and
       (v) compute a refined location based on the logical product.

16. The apparatus of claim 15 wherein the application is further configured to:
    gather empirical data; and
    progressively refine the rule base based on the empirical data.

17. The apparatus of claim 15 wherein the rule base provides a default rule.

18. The apparatus of claim 15 wherein the rule base is configured to reflect regional trends, social trends, or demographic trends.

19. The apparatus of claim 15 wherein one of the rules utilizes a logical product in an antecedent to determine a consequent.

20. The apparatus of claim 15 wherein the imprecise input is spatio-temporal.

21. The apparatus of claim 15 wherein the magnitude of participation is within an interval [0,1].

22. The apparatus of claim 15 wherein a membership function defines a three-valued set for each imprecise input, wherein the three-valued set comprises a truth value; a false value, and an uncertainty value.

23. The apparatus of claim 15 wherein the logical product of each rule comprises a value between 0 and 1.

24. The apparatus of claim 15 wherein the inference engine is configured to compute a refined location by:

selecting the rule with the highest logical product; and using a consequent corresponding to the selected logical product as the refined location.

25. The apparatus of claim 15 wherein the refined location comprises a list of candidate locations.

26. The apparatus of claim 15 wherein the particular user identified location comprises a user identified favorite location.

27. The apparatus of claim 15 wherein the particular user identified location comprises a recently visited location of the current user.

28. The apparatus of claim 15 wherein comprises a list of lists of candidate locations.

29. A program storage device, readable by a computer, tangibly embodying at least one program of instructions executable by a computer to perform method steps for refining a location of a device, wherein the method steps comprise:

(a) determining an approximate location of a device;

(b) reading a rule base that comprises an ordered collection of rules;

(c) capturing an imprecise input, wherein the imprecise input is based on:
  (i) a proximity to a particular user identified location;
  (ii) a similarly between a current user's activity and a particular established activity profile; or
  (iii) whether a current time is within a particular temporal range or temporal profile;

(d) processing the imprecise input to determine a magnitude of participation of the input in the rules;

(e) applying the rules to the imprecise input based on the magnitude of participation to produce a logical product; and (f) computing a refined location based on the logical product.

30. The program storage device of claim 29, wherein the method steps further comprise:

gathering empirical data; and progressively refining the rule base based on the empirical data.

31. The program storage device of claim 29 wherein the rule base provides a default rule.

32. The program storage device of claim 29 wherein the rule base is configured to reflect regional trends, social trends, or demographic trends.

33. The program storage device of claim 29 wherein one of the rules utilizes a logical product in an antecedent to determine a consequent.

34. The program storage device of claim 29 wherein the imprecise input is spatio-temporal.

35. The program storage device of claim 29 wherein the magnitude of participation is within an interval [0,1].

36. The program storage device of claim 29 wherein the method steps further define a three-valued set for each imprecise input, wherein the three-valued set comprises a truth value, a false value, arid an uncertainty value.

37. The program storage device of claim 29 wherein the logical product of each rule comprises a value between 0 and 1.

38. The program storage device of claim 29 wherein the method steps compute the refined location by;

selecting the rule with the highest logical product; and using a consequent corresponding to the selected logical product as the refined location.

39. The program storage device of claim 29 wherein the refined location comprises a list of candidate locations.

40. The program storage device of claim 29 wherein the particular user identified location comprises a user identified favorite location.

41. The program storage device of claim 29 wherein the particular user identified location comprises a recently visited location of the current user.

42. The program storage device of claim 29 wherein comprises a list of lists of candidate locations.

* * * * *

UNITED STATES PATENT AND TRADEMARK OFFICE
CERTIFICATE OF CORRECTION

PATENT NO. : 6,978,258 B2  Page 1 of 1
APPLICATION NO. : 10/034442
DATED : December 20, 2005
INVENTOR(S) : Nemmara Chithambaram It is certified that error appears in the above-identified patent and that said Letters Patent is hereby corrected as shown below:

Column 18, line 37, claim 15: "ruler" should read --rules--.

Column 19, line 7, claim 22; should read -- "," --.

Column 20, line 25, claim 36: arid should read --and an--.

Signed and Sealed this

Seventh Day of November, 2006

JON W. DUDAS
*Director of the United States Patent and Trademark Office*